United States Patent
Matsuda

(10) Patent No.: US 6,730,716 B2
(45) Date of Patent: May 4, 2004

(54) EMULSION INK FOR STENCIL PRINTING

(75) Inventor: Hiroshi Matsuda, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/742,426

(22) Filed: Dec. 22, 2000

(65) Prior Publication Data

US 2001/0007882 A1 Jul. 12, 2001

(30) Foreign Application Priority Data

Dec. 24, 1999 (JP) ............................................. 11-366013

(51) Int. Cl.$^7$ ............................ C09D 11/10; C08K 3/38; C08L 33/02; C08L 33/08
(52) U.S. Cl. ........................ 523/160; 524/405; 524/556; 524/801
(58) Field of Search ................................. 523/160, 161; 106/31.25, 31.26; 524/405, 556, 801

(56) References Cited

U.S. PATENT DOCUMENTS

| 4,585,815 | A | | 4/1986 | Ono et al. | |
|---|---|---|---|---|---|
| 5,378,739 | A | * | 1/1995 | Koike et al. | 523/161 |
| 5,800,599 | A | * | 9/1998 | Asada | 106/31.26 |
| 5,948,151 | A | * | 9/1999 | Ono et al. | 106/31.26 |
| 6,063,835 | A | * | 5/2000 | Ohshima et al. | 523/161 |
| 6,165,258 | A | | 12/2000 | Asada | |
| 6,190,444 | B1 | * | 2/2001 | Okuda et al. | 106/31.26 |

FOREIGN PATENT DOCUMENTS

| EP | 0846 737 A | 6/1998 |
|---|---|---|
| JP | 06-049401 A | 2/1994 |
| JP | 06-145576 A | 5/1994 |
| JP | 06-220383 A | 8/1994 |
| JP | 06-329970 A | 11/1994 |
| JP | 07-150091 A | 6/1995 |
| JP | 2000017215 | 11/1999 |

OTHER PUBLICATIONS

English Translation of JP 06049401 (1994).*

* cited by examiner

Primary Examiner—Callie Shosho
(74) Attorney, Agent, or Firm—Nixon Peabody LLP; Donald R. Studebaker

(57) ABSTRACT

A stencil printing emulsion ink includes an oil phase component, a water phase component and at least one of alkyl-modified carboxyvinyl polymer and carboxyvinyl polymer.

11 Claims, No Drawings

EMULSION INK FOR STENCIL PRINTING

BACKGROUND OF THE INVENTION

1. Field of the Invention

This invention relates to emulsion ink for stencil printing, and more particularly to stencil printing emulsion ink free from an emulsifier which forms a liquid crystal structure between the oil phase and the water phase.

2. Description of the Related Art

The stencil printing is a method of printing in which paper and the like is printed by transferring ink from one side of a stencil to the other side. Stencil printing ink has been improved from various viewpoints such as working properties including handling properties, printing properties and the like or film properties such as workability, drying characteristics, color, film strength, resistances to various factors and the like.

Various stencil printing emulsion inks which are improved in their storage stability have been proposed. For instance, in Japanese Unexamined Patent Publication No. 6(1994)-49401, there is disclosed an emulsion ink in which the HLB (hydrophilic-lipophilic balance) is set to 3 to 5.5 and the water phase is thickened. In Japanese Unexamined Patent Publication No. 6(1994)-145576, there is disclosed an emulsion ink in which the oil phase contains therein 0.5 to 5.0% of sorbitol fatty ester which is 12 to 24 in number of carbon atoms and is not larger than 7 in HLB. In Japanese Unexamined Patent Publication No. 6(1994)-220383, there is disclosed an emulsion ink in which the oil phase contains therein two kinds of emulsifiers, one being 0.1 to 3.0 in HLB and the other being 5.0 to 15.0 in HLB. In Japanese Unexamined Patent Publication No. 6(1994)-329970, there is disclosed an emulsion ink containing therein sorbitan fatty ester or glycerin-fatty acid ester which is 1.5 to 3.0 in HLB. Further, in Japanese Unexamined Patent Publication No. 7(1995)-150091, there is disclosed an emulsion ink in which the oil phase contains therein nonionic emulsifier not larger than 10 in HLB and water-soluble magnesium salt.

In the conventional emulsion ink, a nonionic emulsifier is employed as a means for improving the storage stability, and those in which ability of polyglycerol fatty-ester to form liquid crystal is utilized are prevailing.

Generally the emulsifier is adsorbed by an interface of an oil phase and a water phase under the balance of the hydrophilic nature and the lipophilic nature (hydrophobic nature) and greatly reduces the free energy (or surface tension) of the interface, thereby facilitating formation of emulsion. Though the majority of the emulsifiers forms emulsion adsorbed by the interface in monomolecular film, the polyglycerol fatty-ester is adsorbed by the interface in ploymolecular film, that is, in the case of the polyglycerol fatty-ester, a plurality of polyglycerol fatty-ester films are formed around a water phase of a W/O emulsion ink (or an oil phase in the case of an O/W emulsion ink) and a so-called liquid crystal structure is formed. It is conceived that this is the reason why highly stable emulsion ink is obtained by polyglycerol fatty-ester.

However, emulsion ink the storage stability of which is improved by formation of a liquid crystal structure involves a problem that penetration of the ink into the printed paper is slow since its water content is less apt to be evaporated due to the liquid crystal structure. Since printed papers are generally superposed one on another immediately after printing, slow penetration of the ink into the printed paper, which normally results in a long drying time, can involve offset (ink on the surface of one printed paper is transferred to the back side of another printed paper) and/or blocking (printed papers are bonded by ink on their surfaces).

Penetration of the emulsion ink into paper is mainly governed by the viscosity of the ink, the surface tension of the water phase, and separation of the water phase from the oil phase when the ink is transferred to the paper. Accordingly, in order to improve penetration of the emulsion ink into paper, the viscosity of the ink should be low, the surface tension of the water phase should be low and separation of the water phase from the oil phase should be rapid. However, when the emulsion ink forms a liquid crystal structure, the viscosity of the ink becomes high, the surface tension of the water phase is increased by superposed films and separation of the water phase from the oil phase is slowed, whereby penetration of the emulsion ink into paper becomes very slow. That is, the emulsion ink which is improved with its storage stability by use of an emulsifier which forms a liquid crystal structure between the oil phase and the water phase cannot be rapid in penetration into paper. To the contrast, when the ability of the emulsion ink to form liquid crystal is weakened in order to improve penetration into paper, storage stability is deteriorated. That is, it has been difficult to make emulsion ink which is excellent in both storage stability and penetration into paper by use of the known emulsifiers.

SUMMARY OF THE INVENTION

In view of the foregoing observations and description, the primary object of the present invention is to provide emulsion ink which is excellent in storage stability, penetration into paper and coloring material fixing performance.

The emulsion ink in accordance with the present invention comprises an oil phase component, a water phase component and alkyl-modified carboxyvinyl polymer and/or carboxyvinyl polymer.

The emulsion ink of this invention may contain alkyl-modified carboxyvinyl polymer or carboxyvinyl polymer alone or may contain both alkyl-modified carboxyvinyl polymer and carboxyvinyl polymer in combination.

Carboxyvinyl polymer is normally an acid high polymer of polymerized acrylic acids. The carboxyvinyl polymer may be a carboxyvinyl polymer salt. The alkyl-modified carboxyvinyl polymer is a polymer which is provided with the emulsifying ability by converting part of hydrophilic groups of the aforesaid carboxyvinyl polymer into hydrophobic groups. The alkyl-modified carboxyvinyl polymer or the carboxyvinyl polymer may be selected from those which are commercially available, but those which are small in change with time of viscosity and highly stable are preferred.

The alkyl-modified carboxyvinyl polymer and the carboxyvinyl polymer themselves normally lean toward acidity, whereas the stencil printing emulsion ink is generally kept neutral. Accordingly, the stencil printing emulsion ink of the present invention, it is preferred that the acidity of the alkyl-modified carboxyvinyl polymer and/or the carboxyvinyl polymer be neutralized. As a neutralization agent, an alkali such as borax, sodium hydroxide, potassium hydroxide, or ammonia may be used. From the viewpoint of fixation of the ink, borax is preferred. Borax is a water-containing borate mineral having composition represented by $Na_2B_4O_7 \cdot 10H_2O$.

It is preferred that borax is contained in 0.001 to 2% by weight of the total weight of the ink, more preferably in 0.05 to 1.0% by weight, and most preferably in 0.01 to 0.5% by weight.

The content of the alkyl-modified carboxylvinyl polymer and/or the carboxyvinyl polymer is preferably 0.01 to 1% by weight, more preferably 0.01 to 0.6% by weight, and most preferably 0.2 to 0.4% by weight of the total weight of the ink irrespective of the kind of the alkyl-modified carboxyvinyl polymer and/or the carboxyvinyl polymer, or whether only one of the alkyl-modified carboxyvinyl polymer and the carboxyvinyl polymer is used or both the alkyl-modified carboxyvinyl polymer and the carboxyvinyl polymer are used in combination.

It is preferred that the ink is in the form of a W/O emulsion in which the content of the oil phase is preferably 20 to 40% by weight, more preferably 25 to 38% by weight, and most preferably 30 to 36% by weight of the total weight of the ink and the content of the water phase is preferably 60 to 80% by weight, more preferably 62 to 75% by weight, and most preferably 64 to 70% by weight of the total weight of the ink.

The emulsion ink of the present invention is excellent in storage stability, penetration into paper and coloring material fixing performance because of its composition.

That is, in the case of ink where an emulsifier which forms a liquid crystal structure between the oil phase and the water phase is employed as in the conventional emulsion ink, it is difficult for the emulsion to have both good storage stability and rapid penetration into paper. To the contrast, in the case of the ink in accordance with the present invention, since the alkyl-modified carboxyvinyl polymer and/or the carboxyvinyl polymer can form an emulsion which is highly stable and is strong in thixotropy and does not form a liquid crystal structure, the ink can be excellent in storage stability and rapid in penetration into a printing material such as paper.

It is conceived that the reason the alkyl-modified carboxyvinyl polymer and/or the carboxyvinyl polymer can form an emulsion which is highly stable and is strong in thixotropy is that the emulsifier forms a micro-capsule-like emulsion on the interface of the oil phase and the water phase. Further, since the micro-capsule-like emulsion is readily broken when the ink is transferred to the paper, separation of the water phase from the interface is promoted and accordingly penetration into paper and coloring material fixing performance are improved.

The emulsion size can be easily controlled within the range from about 1 $\mu$m to 5 mm according to the content of the alkyl-modified carboxyvinyl polymer and/or the carboxyvinyl polymer, and accordingly, the viscosity of the ink can be easily controlled to a desired value by changing the content of the alkyl-modified carboxyvinyl polymer and/or the carboxyvinyl polymer.

Generally, penetration of stencil printing emulsion ink into a printing material is generally increased by reducing the viscosity of the ink to reduce the interfacial tension of the ink, especially the interfacial tension of the water phase. When borax is added to the stencil printing emulsion ink of the present invention, reduction of the interfacial tension of the water phase is facilitated and the penetration of the ink can be further improved.

DETAILED DESCRIPTION OF THE INVENTION

The present invention will be described in more detail with reference to embodiments, hereinbelow.

The stencil printing emulsion ink in accordance with the present invention comprises an oil phase component, a water phase component and alkyl-modified carboxyvinyl polymer and/or carboxyvinyl polymer.

The emulsion ink of this invention may contain alkyl-modified carboxyvinyl polymer or carboxyvinyl polymer alone or may contain both alkyl-modified carboxyvinyl polymer and carboxyvinyl polymer in combination.

The carboxyvinyl polymer is commercially available as, for instance, Carbopol series polymers (BFGoodrich), AqupecHV-501 series polymers (Sumitomo Seika), JYUNRON-PW series polymers (Nippon Pure Chemical Industries, LTD), HIBISWAKO Series polymers (Wako Pure Chemical Industries, LTD), and Unisafe ECT-203 (carboxyvinyl polymer-calcium-potassium salt: Nihon Yusi). The Carbopol series polymers are especially preferred.

Among commercially available alkyl-modified carboxyvinyl polymer, for instance, Pemulen TR-1 (BFGoodrich) and Pemulen TR-2 (BFGoodrich) are preferred.

The oil phase may contain resin, solvent, coloring agents and the like. When the water phase contains coloring agents, the oil phase need not contain a coloring agent.

Polyamide resin, urethane resin, alkyd-modified phenol resin, rosin ester resin, rosin-modified alkyd resin, rosin-modified phenol resin, alkyd resin, petroleum resin, compounds of fats and oils, modified compounds of fats and oils, gilsonite, polybutadiene, polybutadienehydride, acrylic resin, melamine resin, urea resin, phenol resin, polyester resin, silicone resin, epoxy resin, cellulose resin, and the like may be suitably used. The resin in the oil phase improves dispersion of the coloring agents and fixes the coloring agents to the printing paper. The iodine value of the resin need not be limited. However, if the iodine value of the resin exceeds 100, the stencil printing ink dries and solidifies too fast, which can result in clogging. From the viewpoint of stability of the ink, it is preferred that the iodine value of the resin be not larger than 100.

Any solvent which has been known as solvent for the stencil printing ink can be employed irrespective of whether it is volatile or non-volatile. As the non-volatile solvents, mineral oil solvents such as motor oil, spindle oil, machine oil, liquid paraffin, aroma-free solvents or the like or vegetable oil such as olive oil, soybean oil, coconut oil, tall oil, castor oil, dehydrated castor oil, safflower oil or the like can be employed. As the volatile solvents, aromatic hydrocarbon solvents, aliphatic hydrocarbon solvents, mixtures of aromatic hydrocarbon solvent and aliphatic hydrocarbon solvent, paraffin hydrocarbon solvents, isoparaffin hydrocarbon solvents, naphthenic hydrocarbon solvents or the like can be employed. Since the stencil printing is used wide by general users such as schools and public agencies, aliphatic hydrocarbon solvents are preferred among these solvents from the viewpoint of safety and/or sanitation.

The solvents may be used either alone or in a mixture. As a mixture of the solvents, a mixture of spindle oil and an aliphatic hydrocarbon solvent, a mixture of spindle oil, an aliphatic hydrocarbon solvent and castor oil, and the like can be employed. When a mixture of a non-volatile solvent and a volatile solvent is used, the ratio of the former to the latter (non-volatile solvent/volatile solvent) is preferably in the range of 50 to 95% by weight/50 to 5% by weight though depending upon the oil phase/water phase ratio in the emulsion ink.

As the coloring agent, known pigments and dyes of various colors may be employed. As the pigment, organic pigments such as azo-pigments, phthalocyanine pigments, dye pigments, condensation polycyclic pigments, nitro-pigments, nitroso pigments, and the like (e.g., brilliant carmine 6B, lake red C, Watching red, diazo yellow, Hansa yellow, phthalocyanine blue, phthalocyanine green, alkali blue, aniline black), inorganic pigments such as metals (e.g., cobalt, iron, chrome, copper, zinc, lead, titanium, vanadium, manganese, nickel), metal oxides, metal sulfides, carbon blacks (e.g., furnace black, lamp black, channel black), yellow ocher, ultramarine, iron blue pigments and the like can be employed.

Extending pigments may be contained in the oil phase and/or the water phase. Any known extending pigment may be used so long as it is in the form of water-insoluble fine particles. For example, inorganic particles of china clay, talc, clay, diatomaceous earth, calcium carbide, barium sulfate, titanium oxide, alumina white, silica, kaolin, mica and aluminum hydroxide and organic particles of polyacrylate, polyurethane, polyester, polyethylene, polypropylene, polyvinyl chloride, polyvinylidene chloride, polystyrene, polysiloxane, phenol resin, epoxy resin, benzoguanamine and copolymers thereof can be employed.

In addition to water and borax, the water phase components of the stencil printing emulsion ink of the present invention may include electrolytes, evaporation retardants, water-soluble high polymers, preservatives, mildew proofing agents, antioxidants, pH adjustors and the like. When the oil phase contains no coloring agent, the water phase may contain a coloring agent such as those described above in conjunction with the coloring agents which may be contained in the oil phase.

Embodiment 1

17 parts by weight of alkyd resin RS1237 (Harima Chemicals, inc.), 6 parts by weight of carbon black MA-100 (Mitsubishi Chemical corporation) as a coloring agent, 11.5 parts by weight of No. 4 solvent AF-4 (Nisseki Mitsubishi) as solvent and 0.01 parts by weight of Pemulen TR-2 (BFGoodrich) as alkyl-modified carboxyvinyl polymer were mixed well and dispersed by a triple roll mill, thereby obtaining an oil phase. A water phase obtained by mixing 65.48 parts by weight of ion-exchange water with 0.01 parts by weight of borax (Wako Pure Chemical Industries, LTD) was added to the oil phase while stirring to emulsify the mixture, whereby stencil printing W/O emulsion ink of a first embodiment of the present invention was obtained.

Embodiment 2

Stencil printing W/O emulsion ink of a second embodiment was obtained in the same manner as the first embodiment except that the composition was as shown in the following table 1.

Embodiment 3

Stencil printing W/O emulsion ink of a third embodiment was obtained in the same manner as the first embodiment except that the composition was as shown in the following table 1.

Embodiment 4

Stencil printing W/O emulsion ink of a fourth embodiment was obtained in the same manner as the first embodiment except that the composition was as shown in the following table 1 and carboxyvinyl polymer, Carbopol 980 (BFGoodrich), was used instead of the alkyl-modified carboxyvinyl polymer.

Embodiment 5

Stencil printing W/O emulsion ink of a fifth embodiment was obtained in the same manner as the first embodiment except that the composition was as shown in the following table 1 and petroleum resin ARCON P-115 (Arakawa Chemical Industries, LTD) dissolved in AF-4 (Nippon Mitsubishi Oil Corporation) was used instead of the alkyd resin.

Embodiment 6

Stencil printing W/O emulsion ink of a sixth embodiment was obtained in the same manner as the fourth embodiment except that the composition was as shown in the following table 1 and petroleum resin ARCON P-115 (Arakawa Chemical inc.) dissolved in AF-4 (Nippon Mitsubishi Oil Corporation) was used instead of the alkyd resin.

Embodiment 7

Stencil printing W/O emulsion ink of a seventh embodiment was obtained in the same manner as the first embodiment except that the composition was as shown in the following table 1 and copper phthalocyanine GFR (Dainippon Ink and Chemicals Incorporated) was used instead of the carbon black MA-100.

Embodiment 8

Stencil printing W/O emulsion ink of an eighth embodiment was obtained in the same manner as the seventh embodiment except that the composition was as shown in the following table 1 and carboxyvinyl polymer, Carbopol 980 (BFGoodrich), was used instead of the alkyl-modified carboxyvinyl polymer.

TABLE 1

| unit: parts by weight | | emb. 1 | emb. 2 | emb. 3 | emb. 4 | emb. 5 | emb. 6 | emb. 7 | emb. 8 |
|---|---|---|---|---|---|---|---|---|---|
| oil phase | | | | | | | | | |
| coloring agent | carbon black | 6.00 | 6.00 | 6.00 | 6.00 | 6.00 | 6.00 | | |
| | copper phthalocyanine | | | | | | | 6.00 | 6.00 |
| emulsifier | HG-50 | | | | | | | | |
| | HG-60 | | | | | | | | |
| | HG-PR-15 | | | | | | | | |
| | alkyl-modified carboxyvinyl polymer | 0.01 | 0.05 | 1.00 | | 1.00 | | 1.00 | |
| | carboxyvinyl polymer | | | | 0.10 | | 1.00 | | 1.00 |
| resin | petroleum resin | | | | | 17.00 | 15.00 | | |
| | alkyd resin | 17.00 | 17.00 | 17.00 | 15.00 | | | 17.00 | 17.00 |
| solvent | AF4 | 11.50 | 12.00 | 10.50 | 12.00 | 11.00 | 10.00 | 11.00 | 11.00 |

TABLE 1-continued

| unit: parts by weight | | emb. 1 | emb. 2 | emb. 3 | emb. 4 | emb. 5 | emb. 6 | emb. 7 | emb. 8 |
|---|---|---|---|---|---|---|---|---|---|
| water phase | | | | | | | | | |
| borax | | 0.01 | 0.001 | 0.01 | 2.00 | 0.01 | 0.01 | 0.01 | 0.01 |
| water | ion-exchange water | 65.48 | 64.95 | 65.49 | 64.90 | 64.99 | 67.99 | 64.99 | 64.99 |
| total | | 100 | 100 | 100 | 100 | 100 | 100 | 100 | 100 |

COMPARATIVE EXAMPLE 1

Stencil printing W/O emulsion ink of a first comparative example was obtained in the same manner as the first embodiment except that the composition was as shown in the following table 2 and hexaglycerine 5 oleate (HG-50; Nikko Chemical inc) was used as the emulsifier instead of the alkyl-modified carboxyvinyl polymer.

COMPARATIVE EXAMPLE 2

Stencil printing W/O emulsion ink of a second comparative example was obtained in the same manner as the first comparative example except that the composition was as shown in the following table 2 and hexaglycerine 6 oleate (HG-60; Nikko Chemical inc) was used as the emulsifier instead of the alkyl-modified carboxyvinyl polymer.

COMPARATIVE EXAMPLE 3

Stencil printing W/O emulsion ink of a third comparative example was obtained in the same manner as the fifth embodiment except that the composition was as shown in the following table 2 and hexaglycerine PR15 (HG-PR-15; Nikko Chemical inc) was used as the emulsifier.

COMPARATIVE EXAMPLE 4

Stencil printing W/O emulsion ink of a fourth comparative example was obtained in the same manner as the second comparative example except that the composition was as shown in the following table 2 and copper phthalocyanine GFR (Dainihon Ink inc.) was used instead of the carbon black MA-100.

COMPARATIVE EXAMPLE 5

Stencil printing W/O emulsion ink of a third comparative example was obtained in the same manner as the fourth comparative example except that the composition was as shown in the following table 2, hexaglycerine 5 oleate (HG-50; Nikko Chemical inc) was used as the emulsifier and petroleum resin ARCON P-115 (Arakawa Chemical Industries, LTD) dissolved in AF-4 solvent (Nippon Mitsubishi Oil Corporation) was used instead of the alkyd resin.

COMPARATIVE EXAMPLE 6

Stencil printing W/O emulsion ink of a third comparative example was obtained in the same manner as the fourth comparative example except that the composition was as shown in the following table 2 and hexaglycerine PR15 (HG-PR-15; Nikko Chemical inc) was used as the emulsifier.

TABLE 2

| unit: parts by weight | | ex. 1 | ex. 2 | ex. 3 | ex. 4 | ex. 5 | ex. 6 |
|---|---|---|---|---|---|---|---|
| oil phase | | | | | | | |
| coloring agent | carbon black | 6.00 | 6.00 | 6.00 | | | |
| | copper phthalocyanine | | | | 5.00 | 5.00 | 5.00 |
| emulsifier | HG-50 | 2.00 | | | | 2.00 | |
| | HG-60 | | 2.00 | | 2.00 | | |
| | HG-PR-15 | | | 2.00 | | | 2.00 |
| | alkyl-modified carboxyvinyl polymer | | | | | | |
| | carboxyvinyl polymer | | | | | | |
| resin | petroleum resin | | | 15.00 | | 15.00 | |
| | alkyd resin | 17.00 | 17.00 | | 17.00 | | 17.00 |
| solvent | AF4 | 11.00 | 10.00 | 12.00 | 13.00 | 13.00 | 11.00 |
| water phase | | | | | | | |
| borax | | | 0.10 | 0.01 | | | 0.10 |
| water | ion-exchange water | 64.00 | 64.90 | 64.99 | 63.00 | 65.00 | 64.90 |
| total | | 100 | 100 | 100 | 100 | 100 | 100 |

Method of Test and Evaluation

The storage stability of the stencil printing W/O emulsion inks of the first to eighth embodiments and the first to sixth comparative examples were subjected to an accelerated test at 70° C. (ten weeks), an accelerated test at 50° C. (ten weeks), and a cycle test in which the ink storage temperature was changed every twelve hours within the range of 50° C.

to 20° C. for ten days. Then the inks were visually evaluated, and when there was observed no separation of oil, the ink was marked with ○ in the following table 3, whereas when there was observed separation of oil, the ink was marked with x in the following table 3 irrespective of the degree of separation.

Further, using the stencil printing W/O emulsion inks of the first to eighth embodiments and the first to sixth comparative examples, printing was made on thin paper specified by RISO KAGAKU CORPORATION by a stencil printer, RISOGRAPH FR395 (RISO KAGAKU CORPORATION). After printing, the printed papers were allowed to stand at room temperature for one day, and then rubbed with a crockmeter. Thereafter, the printed papers were visually checked, and when almost no rubbing off was visually observed, the ink was marked with ○ in the following table 3, whereas when rubbing off was clearly observed, the ink was marked with x in the following table 3.

TABLE 3

| | storage stability | | | |
| --- | --- | --- | --- | --- |
| | accelerated test at 70° C. | accelerated test at 50° C. | cycle test | fixation |
| embodiment 1 | ○ | ○ | ○ | ○ |
| embodiment 2 | ○ | ○ | ○ | ○ |
| embodiment 3 | ○ | ○ | ○ | ○ |
| embodiment 4 | ○ | ○ | ○ | ○ |
| embodiment 5 | ○ | ○ | ○ | ○ |
| embodiment 6 | ○ | ○ | ○ | ○ |
| embodiment 7 | ○ | ○ | ○ | ○ |
| embodiment 8 | ○ | ○ | ○ | ○ |
| compara. ex 1 | ○ | ○ | ○ | X |
| compara. ex 2 | ○ | ○ | ○ | X |
| compara. ex 3 | X | X | X | ○ |
| compara. ex 4 | ○ | ○ | ○ | X |
| compara. ex 5 | ○ | ○ | ○ | X |
| compara. ex 6 | X | X | X | ○ |

As can be understood from table 3, in the case of the stencil printing emulsion inks prepared by the use of conventional emulsifiers, when the storage stability was good, the fixation was bad (the first, second, fourth and fifth comparative examples), and when the fixation was good, the storage stability was bad (the third and sixth comparative examples). To the contrast, in the case of the stencil printing emulsion inks of the present invention where the storage stability was enhanced by alkyl modified carboxyvinyl polymer and/or carboxyvinyl polymer, the inks were excellent in both the storage stability and the fixation.

Though, in the embodiments described above, the present invention is applied to the W/O emulsion ink, the present invention can be applied also to the O/W emulsion ink. Further, though in the embodiments described above, one of alkyl-modified carboxyvinyl polymer and carboxyvinyl polymer is employed, a mixture of alkyl-modified carboxyvinyl polymer and carboxyvinyl polymer may be used.

In addition, all of the contents of Japanese Patent Application No. 11(1999)-366013 are incorporated into this specification by reference.

What is claimed:

1. A stencil printing emulsion ink comprising:
   an oil phase component,
   a water phase component,
   an alkyl-modified carboxyvinyl polymer in which the content of the alkyl-modified carboxyvinyl polymer is 0.01 to 1% by weight of the total weight of the ink, and
   borax, wherein said ink is free from an emulsifier which forms a liquid crystal structure between the oil phase and the water phase.

2. A stencil printing emulsion ink as set forth in claim 1, wherein the content of the alkyl-modified carboxyvinyl polymer is 0.1 to 0.6% by weight of the total weight of the ink.

3. A stencil printing emulsion ink as set forth in claim 1, wherein the content of the alkyl-modified carboxyvinyl polymer is 0.2 to 0.4% by weight of the total weight of the ink.

4. A stencil printing emulsion ink as set forth in claim 1, wherein the borax is 0.001 to 2% by weight of the total weight of the ink.

5. A stencil printing emulsion ink as set forth in claim 1, wherein the ink is in the form of a W/O emulsion in which the content of the oil phase is 20 to 40% by weight of the total weight of the ink and the content of the water phase is 60 to 80% by weight of the total weight of the ink.

6. A stencil printing emulsion ink comprising;
   an oil phase component,
   a water phase component,
   an alkyl-modified carboxyvinyl polymer and carboxyvinyl polymer in which the content of the alkyl-modified carboxyvinyl polymer and the carboxyvinyl polymer is 0.01 to 1% by weight of the total weight of the ink, and
   borax, wherein said ink is free from an emulsifier which forms a liquid crystal structure between the oil phase and the water phase.

7. A stencil printing emulsion ink as set forth in claim 6, wherein the content of the alkyl-modified carboxyvinyl polymer is 0.1 to 0.6% by weight of the total weight of the ink.

8. A stencil printing emulsion ink as set forth in claim 6, wherein the content of the alkyl-modified carboxyvinyl polymer is 0.2 to 0.4% by weight of the total weight of the ink.

9. A stencil printing emulsion ink as set forth in claim 6, wherein the borax is 0.001 to 2% by weight of the total weight of the ink.

10. A stencil printing emulsion ink as set forth in claim 6, wherein the ink is in the form of a W/O emulsion in which the content of the oil phase is 20 to 40% by weight of the total weight of the ink and the content of the water phase is 60 to 80% by weight of the total weight of the ink.

11. A stencil printing emulsion ink comprising:
   an oil phase component,
   a water phase component,
   an alkyl-modified carboxyvinyl polymer and carboxyvinyl polymer in which the content of the alkyl-modified carboxyvinyl polymer and the carboxyvinyl polymer is 0.01 to 1% by weight of the total weight of the ink, and
   borax, in which the content of the borax is 0.001 to 2% by weight of the total weight of the ink, wherein the ink is in the form of a W/O emulsion in which the content of the oil phase is 20 to 40% of the total weight of the ink and the content of the water phase is 60 to 80% of by weight of the total weight of the ink, and wherein said ink is free from an emulsifier which forms a liquid crystal structure between the oil phase and the water phase.

* * * * *